United States Patent
Shearer, III (10) Patent No.: US 6,831,589 B2
(45) Date of Patent: Dec. 14, 2004

(54) RADAR DETECTOR HAVING A MULTI-PERIOD PERIDOCITY VALIDATOR AND METHOD THEREFOR

(75) Inventor: Daniel Davidson MacFarlane Shearer, III, Scottsdale, AZ (US)

(73) Assignee: GlobespanVirata, Inc., Red Bank, NJ (US)

(*) Notice: Subject to any disclaimer, the term of this patent is extended or adjusted under 35 U.S.C. 154(b) by 0 days.

(21) Appl. No.: 10/808,653

(22) Filed: Mar. 24, 2004

(65) Prior Publication Data

US 2004/0201517 A1 Oct. 14, 2004

Related U.S. Application Data

(60) Provisional application No. 60/461,561, filed on Apr. 8, 2003.

(51) Int. Cl.[7] ............................ G01S 7/285; G01S 7/00; G01S 7/40; G01S 13/00
(52) U.S. Cl. ............................ 342/20; 342/89; 342/165; 342/173; 342/175; 342/195; 455/63.1; 455/67.11; 455/67.15
(58) Field of Search ........................ 342/13–20, 33–40, 342/52, 89, 91–93, 159–175, 192–197; 455/63.1, 296, 500, 501, 67.11, 67.15, 226.1

(56) References Cited

U.S. PATENT DOCUMENTS

| 4,622,553 A | 11/1986 | Baba et al. ............ 342/91 |
| 4,899,157 A | * 2/1990 | Sanford et al. ......... 342/40 |
| 4,935,742 A | 6/1990 | Marin ..................... 342/13 |
| 5,461,383 A | * 10/1995 | Ono et al. ............... 342/20 |
| 6,697,013 B2 | * 2/2004 | McFarland et al. ..... 342/159 |

OTHER PUBLICATIONS

D.E. Driscoll et al., "The Detection of Radar Pulse Sequences by Means of a Continuous Wavelet Transform"; Proceedings of the 1999 IEEE International Conference on Acoustics, Speech, and Signal Processing; vol. 3, pp. 1389–1392; Phoenix, Arizona; 1999.*
Nikolich & Hayes, "IEEE 802 Proposal Relating to DFS and JPT5G Proposal," IEEE 802 Regulatory Matters, Jan. 2002.
ETSI "Broadband Radio Access Networks (BRAN); 5 GHz High Performance RLAN; Part 2: Harmonized EN Covering Essential Requirements of Article 3.2 of the R&TTE Directive" Feb. 2002.

* cited by examiner

Primary Examiner—Benarr E. Gregory
(74) Attorney, Agent, or Firm—Jordan M. Meschkow; Lowell W. Gresham; Meschkow & Gresham, PLC (57) ABSTRACT

A radar detector (10) includes a first period detector (76, 122), a second period detector (96, 120) and a third period detector (86, 124) within a multi-period periodicity validator 38. The first period detector (76, 122) detects radar pulses exhibiting one-half of an expected pulse period (48), the second period detector (96, 120) detects radar pulses exhibiting the expected pulse period (48), and the third period detector (86, 124) detects radar pulses exhibiting twice the expected pulse period (48). A plurality of pulse-train records (40) can simultaneously track a plurality of possible pulse trains. A control element (84, 136, 138) accounts for missing pulses and corrects the expected pulse period when missing pulses have caused the expected pulse period to be inaccurate.

22 Claims, 4 Drawing Sheets

RADAR DETECTOR HAVING A MULTI-PERIOD PERIDOCITY VALIDATOR AND METHOD THEREFOR

RELATED INVENTION

The present invention claims benefit under 35 U.S.C. §119(e) to "Wireless LAN Radar Detector Missing Pulse Capability," U.S. Provisional Patent Application Ser. No. 60/461,561 filed 8 Apr. 2003, which is incorporated by reference herein.

TECHNICAL FIELD OF THE INVENTION

The present invention relates generally to the field of radar detectors.

BACKGROUND OF THE INVENTION

European and perhaps worldwide 5 GHz WLANs (Wireless Local Area Networks) and other radio applications are being required to detect radars and change channels if a radar is present. This allows the WLANS or other radio applications to share frequencies currently used only by radars, without interfering with radar operation. In general, if a WLAN or other radio device operates in a frequency band shared with a radar application, the device is desirably configured to determine whether an active radar signal is present in the band, and to transmit only when no active radar signal is present.

Some requirements for radar detection are specified in developing standards documents, such as ITU-R M. [8A–9B/RLAN-DFS] and ETSI EN 300 893 which are being reflected in IEEE 802.11h, an amendment to the IEEE 802.11a WLAN standard. These documents assume nearly perfect and immediate radar detection. The standards require a 60-second observation period before starting WLAN operations on a new frequency. This observation period could result in a wireless network outage of several minutes if a radar is detected on the current frequency and has to check several other frequencies before finding one that is unoccupied. This means that the detector should never indicate a radar is using the frequency when no radar is actually present (a false alarm) because it will lead to intolerable network outages.

The demands on the radar detector are thus very high. Ideally, the radar detector should have nearly 100% probability of detecting a radar, with nearly 0% possibility of false alarm.

The key characteristics of radars that will distinguish them from other signals are that they send out pulses of radio energy of nominally equal duration at nominally constant repetition periods. Thus the presence of pulses all having the same pulse width and the same time period between pulses is a good indicator of the presence of a radar. Different types of radar may have different pulse widths or periods, appropriate to their specific function.

One radar characteristic that causes detection difficulties is scanning. Many radars use a rotating antenna to observe a 360-degree view. This means that the WLAN may receive the radar only when the radar's antenna is pointing directly at the WLAN location. This will be for some finite time duration, depending on the rate of rotation and the antenna type. Several of the types of radars that may be using the band are expected to be received by a WLAN device only long enough to see five pulses. This means that the radar detector used by the WLAN device should detect the radar with nearly 100% probability when it sees just five radar pulses.

The standards further complicate the radar-detection problem by stipulating that radar detectors must work despite the presence of normal WLAN transmissions. These transmissions may make it difficult for the radar detector to see the radar pulses, or may prevent pulse detection altogether. If the radar detector is located within a unit that is itself transmitting normal WLAN signals or other radio signals, the radar detector will not be able to receive radar pulses during those WLAN transmissions. The ETSI document specifies a transmit/quiet duty cycle while the ITU-R document specifies a series of randomly selected WLAN signals and quiet periods. Either of these test conditions can result in legitimate radar pulses going undetected.

Thus, a radar detector should determine whether or not a radar is present by detecting as many of the radar pulses as it can, perhaps out of a total of as few as only five pulses. Some of the radar pulses may not be detected due to normal reception or transmission of WLAN signals. These missing pulses could cause errors in measurements of the time between pulses, which would degrade the detection probability.

Figure 1:
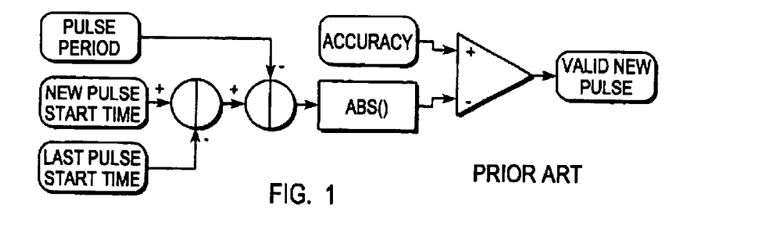
FIG. 1 shows a block diagram of the above-discussed periodicity validator from a prior art radar detector.

FIG. 1 shows a block diagram of a prior art radar detector, and in particular a periodicity validator portion of the radar detector. The periodicity validator is the portion of the radar detector that indicates when a new pulse matches an expected pulse period.

The new pulse period is measured by subtracting the time the last pulse was received from the time the new pulse was received. The new pulse period is compared to an expected pulse period. The expected pulse period is determined from evaluating the duration which occurred between at least two previously-received pulses. The prior art circuit shown in FIG. 1 is usually inactive until two pulses have been received and the time between them has been measured to determine an expected pulse period.

The absolute value of the difference between the new pulse period and the expected pulse period is compared to a desired period-match accuracy. The output of this comparison is 1 if the new-pulse period matches the expected pulse period to within the desired accuracy. If the desired accuracy is not met, the output of the comparison is 0. At the output of the circuit, a 1 indicates that the new pulse period matches the expected period, while a 0 indicates that the pulse does not match the expected period. The radar detector uses this information as part of its detection algorithm. Usually, a predetermined number of valid new pulses must be received before an active radar signal is identified.

This prior art radar detector requires the pulses to be received in consecutive order. Moreover, the number of consecutive pulses that must be received must be at least three, with two of the three pulses being used to establish a period and a third to confirm the period. Unfortunately, the requirement of detecting three consecutive pulses leads to an excessive false-negative rate. The false-negative rate represents the rate at which the radar detector falsely indicates that no radar is present when in fact a radar is present. And, the already-excessive false-negative rate increases further if the number of consecutive pulses that must be received is greater than three.

SUMMARY OF THE INVENTION

It is an advantage of one embodiment of the present invention that an improved radar detector having a multi-period periodicity validator is provided.

Another advantage of one embodiment of the present invention is that a periodicity validator is provided which accounts for missing pulses.

Still another advantage of one embodiment of the present invention is that a pulse evaluator is provided which achieves a suitable false-negative rate because no limitation is imposed regarding the receipt of consecutive radar pulses.

Yet another advantage of one embodiment of the present invention is that a plurality of potential radar pulse trains may be tracked simultaneously.

These and other advantages are realized in one form by an improved radar detector having a multi-period periodicity validator. The radar detector includes a pulse sensor configured to sense a received pulse. A first-period detector couples to the pulse sensor and is configured to detect a first period. A second-period detector couples to the pulse sensor and is configured to detect a second period. The second period is different from the first period. A control element couples to the first-period detector and to the second-period detector. The control element determines if a pulse sensed at the pulse sensor exhibited a period matching one of the first and second periods.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The preferred embodiments of the present invention provide a radar detector and associated method for recognizing missing pulses in a way that increases the probability of detection over a limited number of pulses and reduces the probability of false alarm. Recognition of a missing pulse allows a new pulse to be associated with an expected pulse period, even though the spacing from the last pulse received to the new pulse is not a pulse period that was previously expected. The probability of detection is increased because more radar pulses are usable for determining the presence of a radar, not just contiguously received pulses. The probability of false alarm is decreased because more radar pulses can be required for determining the presence of radar, lessening the chance that random pulses may appear to be periodic.

Figure 2:
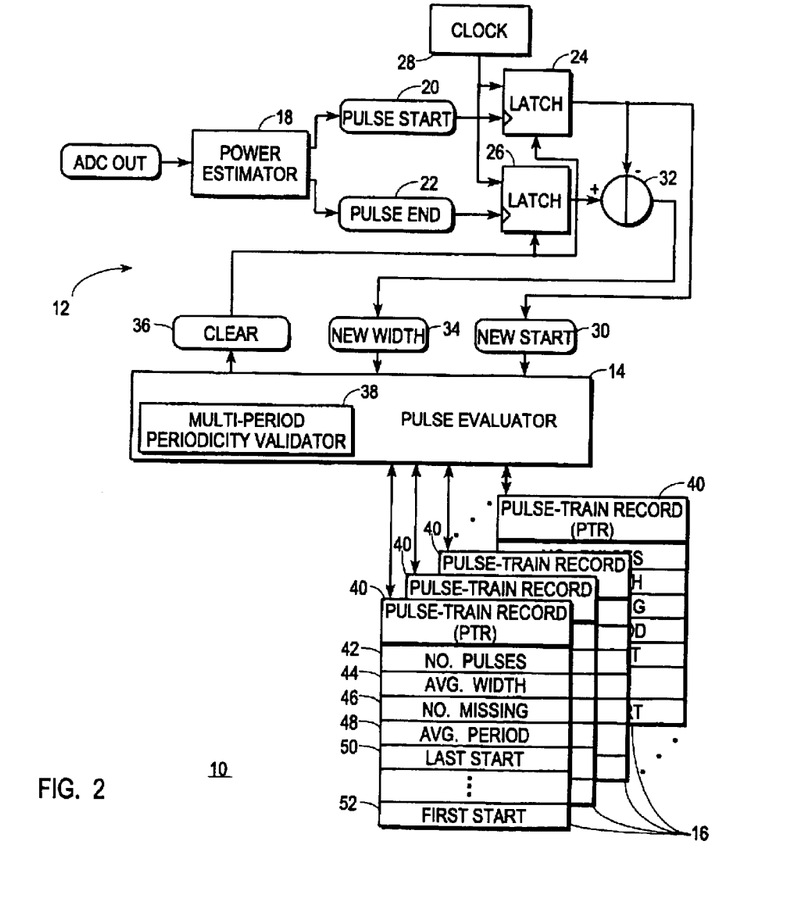
FIG. 2 shows a block diagram of one embodiment of a radar detector configured in accordance with the teaching of the present invention.

FIG. 2 shows a block diagram of one embodiment of a radar detector 10 configured in accordance with the teaching of the present invention. Radar detector 10 includes a pulse sensor 12, a pulse evaluator 14, and a pulse-train register 16. In the preferred embodiment, a received signal is provided in a digital form through a signal labeled "ADC OUT," where "ADC" refers to an analog-to-digital converter. But nothing requires the received signal to be provided in a digital form at this point. This received signal will include pulses from active radar signals within radio range of radar detector 10 as well as other signals present in the band of interest and noise.

The received signal is supplied to a power estimator 18. Power estimator 18 generates a pulse start signal 20 that indicates when the power in the input signal exceeds a predetermined threshold and a pulse end signal 22 that indicates when the power of the input signal falls below a predetermined threshold. The pulse-start and pulse-end thresholds may, but are not required to, be the same.

Pulse-start signal 20 drives a clock input of a latch 24, and pulse-end signal 22 drives a clock input of a latch 26. A clock 28 provides a current time-of-day indication to data inputs of latches 24 and 26. Clock 28 may be configured as a free-running binary counter. When the start of a pulse is detected, a new pulse start time is latched into latch 24; and, when the end of the pulse is detected the pulse end time is latched into latch 26. Although not shown in FIG. 2, circuitry is desirably provided to prevent the time clocked into latches 24 and 26 from being overwritten until cleared and to prevent an ending-time-of-day stamp from being clocked into latch 26 until after a starting-time-of-day stamp has been clocked into latch 24.

An output of latch 24 provides a new-start signal 30, describing the new pulse start time, to pulse evaluator 14. A subtractor 32 has a positive input coupled to an output of latch 26 and a negative input coupled to an output of latch 24. Thus, subtractor 32 subtracts the pulse start time from the pulse end time to determine the pulse width, and a new-width signal 34 describing this pulse width is provided from an output of subtractor 32 to pulse evaluator 14. New-start signal 30 and new-width signal 34 describe timing parameters of a just-received pulse and represent outputs from pulse sensor 12. But in alternate embodiments, the timing parameters may be described differently and other pulse parameters, such as a frequency or channel designation, may be provided from pulse sensor 12 to pulse evaluator 14. In one alternate example, pulse start and end times may be provided to pulse evaluator 14. Pulse evaluator 14 generates a clear signal 36 that drives clear or reset inputs of latches 24 and 26 to enable latches 24 and 26 to record timing parameters for another received pulse.

Pulse evaluator 14 provides a variety of functions which are discussed in detail below in connection with FIG. 3. One of these functions is a multi-period periodicity validator 38. Multi-period periodicity validator 38 differs from the single-period periodicity validator depicted in FIG. 1 in that multi-period periodicity validator 38 declares a pulse to be valid if the timing parameters of that pulse are consistent with any of a variety of acceptable periods rather than merely with only a single expected period. Multi-period periodicity validator 38 is discussed in more detail below in connection with FIGS. 3 and 4.

Pulse evaluator 14 couples to pulse-train register 16. Pulse-train register 16 includes a plurality of pulse-train records (PTRs) 40. Each pulse-train record 40 provides a collection of data that characterize a single pulse train, where a pulse train represents a series of pulses received by radar detector 10 and sensed by pulse sensor 12. Pulse evaluator 14 uses the plurality of pulse-train records 40 to simultaneously track a plurality of pulse trains. Such data may include a data element 42, labeled "NO. PULSES" in FIG. 2, to describe the number of pulses previously received for a subject pulse train. A data element 44 describes the average width of pulses for a subject pulse train.

A data element 46, labeled "NO. MISSING" in FIG. 2, describes the number of pulses that have been declared as having been overlooked in the subject pulse train. Pulses are declared as having been overlooked when pulse sensor 12 fails to sense the overlooked pulses, but multi-period periodicity validator 38 subsequently determines that the pulses were missed by pulse sensor 12. Pulse sensor 12 may fail to sense a legitimate pulse for a variety of reasons. For example, a radar pulse train may exhibit marginal strength, so that some of the pulses in the pulse train exceed a power-level threshold but others don't. Or, a radio application device which incorporates radar detector 10 may have been transmitting at the instant one of the pulses occurred and was unable to receive at that instant. Or, radar detector 10 may have been receiving multiple signals that interfered with one another at the instant one of the pulses occurred.

A data element 48, labeled "AVG. PERIOD" in FIG. 2, describes the expected period between pulses (i.e., the inverse of the pulse repetition frequency) in the subject pulse train. A period can be determined after two pulses are received by measuring the duration between a common point, such as the starting time, on the two pulses. All future pulses in the subject pulse train will be expected to exhibit the period that past pulses have already exhibited. But this period may be subsequently refined by averaging as more pulses are received from the subject pulse train. And, this period may be corrected when subsequent processing determines that it is inaccurate due to overlooked pulses, as discussed below.

A data element 50, labeled "LAST START" in FIG. 2, describes the pulse start time for the last pulse sensed for the subject pulse train. And, a data element 52, labeled "FIRST START" in FIG. 2, describes the pulse start time for the first pulse associated with the subject pulse train. As suggested by ellipsis, each pulse-train record 40 may include additional data elements, such as pulse carrier frequency, a channel designator, a pulse amplitude designation, or the like.

Pulse evaluator 14 may be implemented using a wide variety of techniques, such as a state machine, a microprocessor or other programmable controller, discrete logic circuits, or a combination of these techniques. Pulse-train register 16 may be implemented using memory devices and/or discrete registers and latches.

Figure 3:
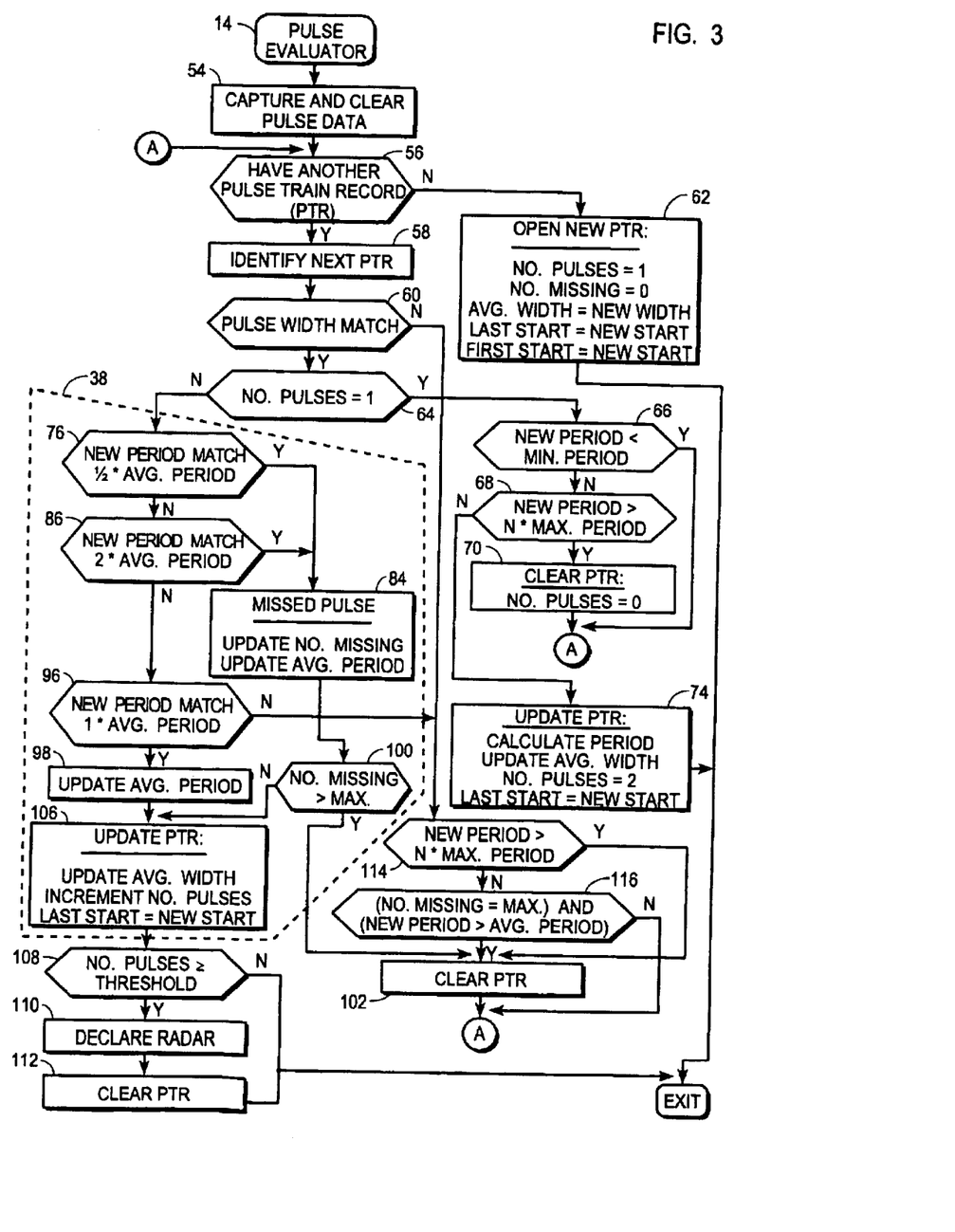
FIG. 3 shows a flow chart depicting exemplary logic functions performed by a pulse evaluator portion of the radar detector shown in FIG. 2.

FIG. 3 shows a flow chart depicting exemplary logic functions performed by pulse evaluator 14. Those skilled in the art may devise either software or hardware or a combination of both that follows the logic functions depicted in FIG. 3, or their equivalent. The flow chart of FIG. 3 presents these logic functions as a collection of tasks. Each task couples to pulse sensor 12 and/or pulse-train register 16 as needed. Thus, at a task 54 pulse evaluator 14 captures timing parameters, such as new start signal 30 and new width signal 34, and any other relevant parameters that characterize a pulse recently sensed by pulse sensor 12 (FIG. 2). In addition task 54 activates clear signal 36 to allow pulse sensor 12 to capture another pulse. Desirably, task 54 is initiated by and performed as soon as possible following the capture of each pulse by pulse sensor 12.

Following task 54, pulse evaluator 14 evaluates pulse-train register 16 to determine with which pulse-train record 40, if any, the recently-captured pulse is best associated. For example, a query task 56 may determine whether or not all opened pulse-train records 40 have been evaluated relative to the recently-captured pulse. For convenience, pulse-train records 40 will be referred to below using the acronym PTR 40. When unevaluated open PTRs 40 remain, a task 58 identifies a next one of the PTRs 40 to evaluate, and a query task 60 determines whether the new width 34 for the recently-captured pulse matches the average pulse width 44 (FIG. 2) recorded in the PTR 40. The PTR 40 identified in task 58 is desirably the oldest unevaluated PTR 40 in pulse-train register 16, but this is not a requirement. Desirably, task 60 declares a match when the new width 34 is within a predetermined tolerance band associated with average pulse width 44. When task 60 determines that no match exists between the new width 34 and the average pulse width 44 for the pulse train characterized by the subject PTR 40, program flow proceeds to a task 114.

Task 114 and subsequent tasks generally test to see if the timing of the recently-captured pulse makes the subject PTR 40 so old that the subject PTR 40 may now be discarded. Task 114 and subsequent tasks are discussed in more detail below. Eventually, program flow returns from task 114 and subsequent tasks to task 56, as indicated by connector "A". When task 56 determines that no additional unevaluated PTRs 40 remain, a task 62 opens a new PTR 40.

By opening a new PTR 40, pulse evaluator 14 recognizes that the recently-captured pulse does not fit into any pulse train currently being tracked by pulse evaluator 14, and pulse evaluator 14 is also recognizing that the recently-captured pulse might be the first pulse sensed for a new pulse train. The opening of a PTR 40 starts or initiates the PTR 40. The PTR 40 selected to open is desirably one that is currently cleared, or if no cleared PTR 40 is available, then the oldest PTR 40. A PTR 40 is opened by setting the number of pulses (NO. PULSES) 42 (FIG. 2) to one, the number of missing pulses (NO. MISSING) 46 (FIG. 2) to zero, the average pulse width 44 for this new pulse train (AVG. WIDTH) equal to the new width 34, and both the last-start-time and first-start-time data elements 50 and 52 of the subject PTR 40 equal to the new start time 30. After task 62, program flow within pulse evaluator 14 exits. But pulse evaluator 14 will activate again when pulse sensor 12 captures another pulse.

When task 60 compares the new width 34 of the recently-captured pulse with the average width 44 recorded for a PTR 40 and detects a match, a query task 64 may be performed. At this point, the width of the recently-captured pulse has been used to associate the recently-captured pulse with a pulse train that pulse evaluator 14 is currently tracking. Subsequent tasks will be performed relative to the PTR 40 that was previously established to track this pulse train. This PTR 40 will be referred to below as the selected PTR 40. Task 64 evaluates the number of pulses 42 recorded in the selected PTR 40. If the number of pulses 42 is one, then the new, recently-captured pulse is the second pulse for that pulse train, and pulse evaluator 14 performs a query task 66.

Task 66 evaluates whether the new period is less than a minimum period. The new period may be the period defined by the duration between the start times of the last pulse, as provided by data element 50, and the new pulse, as provided by signal 30. The minimum period is a predetermined period that is less than the period of the radar signal that has the shortest period of all radar signals to be detected. If the new period is less than the predetermined minimum, then the new pulse is assumed to be noise rather than a legitimate radar pulse, and program flow returns to task 56, as indicated through connector "A" in FIG. 3. Pulse evaluator 14 will evaluate whether other PTR's 40 having the same pulse width but a different period are being tracked.

When task 66 determines that the new period is greater than or equal to the minimum, a query task 68 evaluates whether the new period is greater than a maximum period. The maximum period is a predetermined period that is greater than the period of the radar signal that has the longest period of all radar signals to be detected. Moreover, the evaluation in task 68 compares the new period against an integral multiple "N" of this maximum period. The integral multiplier N is determined in response to the maximum number of consecutive pulses that pulse evaluator 14 is permitted to miss between sensed or previously accounted for pulses while still being able to declare a pulse train as representing an active radar signal. In particular, N is one greater than the number of permitted consecutive missed pulses. In the preferred embodiments described herein, in order to declare a pulse train as being an active radar signal no more than one overlooked pulse is permitted between sensed or previously-accounted-for missed pulses, the integral multiplier N is two, and task 68 tests for a new period of more than twice the maximum period. But alternate embodiments can permit two, three, four, or more consecutive missed pulses between sensed or previously-accounted-for missed pulses, and the integral multiplier N would be three, four, or five, respectively, with task 68 testing for three, four, and five times the maximum period.

When task 68 determines that the new period is greater than the integral multiplier N times the maximum period, then pulse evaluator 14 performs a task 70 to clear the selected PTR 40. Generally, a selected PTR 40 is cleared when pulse evaluator 14 determines that the selected PTR 40 is tracking a pulse train that cannot serve as a basis for indicating the detection of an active radar signal. That scenario occurs at task 70 because task 68 has determined that the period for this pulse train would be too large for the pulse train to be one of the radars being detected. Task 70 may, for example, clear the selected PTR 40 by setting the number of pulses 42 to zero and/or setting the average pulse width 44 to zero.

After task 70 clears the selected PTR 40, program flow returns to task 56, as indicated through connector "A". Pulse evaluator 14 will then evaluate whether other PTR's 40 having the same pulse width but a different period are being tracked.

When task 68 determines that the new period is less than or equal to the integral multiplier N times the maximum period, pulse evaluator 14 assumes that a legitimate second pulse has been found for the pulse train represented by the selected PTR 40, and pulse evaluator 14 performs a task 74. Task 74 updates the selected PTR 40. In particular, task 74 establishes an expected period for the pulse train. The expected period may be calculated to be the duration between the first and second pulses, as determined by the difference between new start 30 and last start 50. This expected period is stored as the average period 48 of the selected PTR 40. In addition, task 70 updates the average pulse width 44 for the selected PTR 40 as follows:

Updated average pulse width=$(APW*NP+NW)/(NP+1)$,   EQ. 1 where,

APW=old average width 44 for the selected PTR 40,
NP=old number of pulses 42 for the selected PTR 40, and
NW=new width 34 for the recently captured pulse.

Task 74 also sets the number of pulses 42 at two and overwrites last start 50 with new start 30. Following task 74, program flow exits pulse evaluator 14. But pulse evaluator 14 will activate again when pulse sensor 12 captures another pulse.

Figure 4:
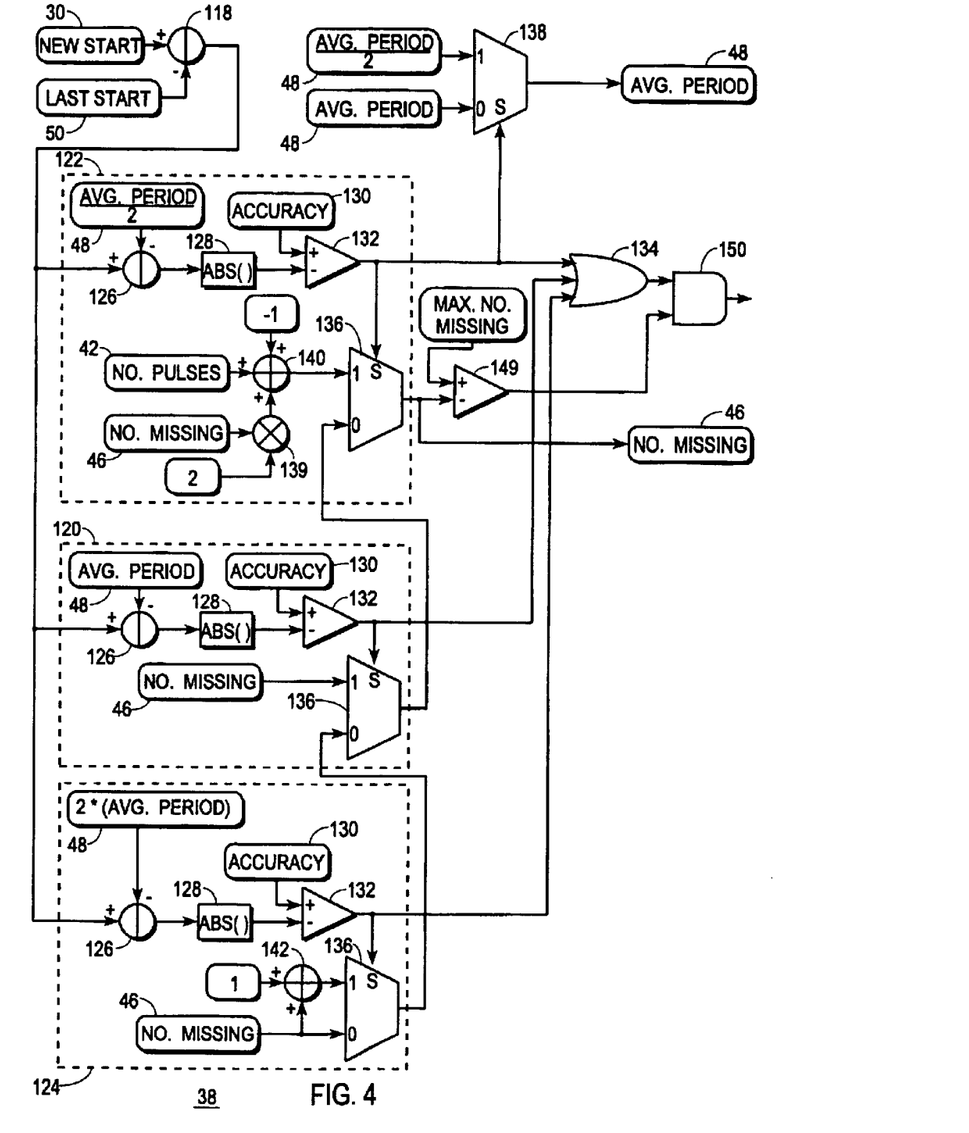
FIG. 4 shows a block diagram of one embodiment of a multi-period periodicity validator portion of the pulse evaluator portion depicted in FIG. 3.

When task 64 determines that the number of pulses for the selected PTR 40 is not equal to one, then the new pulse is assumed to be the third or a subsequent pulse in a pulse train that is currently being tracked by pulse evaluator 14. At the third and subsequent pulses, an expected period has been established for the pulse train and stored in average period 48 of the selected PTR 40. Thus, pulse evaluator 14 now enables multi-period periodicity validator 38 to evaluate whether this third or subsequent pulse for the pulse train exhibits a legitimate period. FIG. 3 depicts an exemplary multi-period periodicity validator 38 in flow chart form that may be easily implemented by software programming, while FIG. 4 depicts an exemplary multi-periodicity validator 38 in block diagram form that may be easily implemented in hardware circuits. The FIG. 3 embodiment is discussed here, and the FIG. 4 embodiment is discussed below.

As discussed above, in the preferred embodiments the integral multiplier N has been set equal to two so that no active radar signal will be recognized by pulse evaluator 14 when more than one pulse is overlooked between sensed or previously-accounted-for pulses. In this scenario, legitimate periods include the expected period, one-half the expected period, and twice the expected period. In an alternate embodiment where N is three, legitimate periods also include one-third, two-thirds, and three times the expected period. For the general case, all rational fractions M/K should be checked, where M and K are each $\leq N+1$.

Referring to FIG. 3, multi-period periodicity validator 38 performs a query task 76 to serve as a period detector for an alternate period from the expected period indicated by average period data element 48 in the selected PTR 40. In particular, task 76 determines whether the timing parameters of the new pulse are consistent with a period of one-half of the expected period. The new period represents the duration between the new pulse and the last pulse, as indicated by the difference between new start 30 and last start 50 of the selected PTR 40.

Figure 5:
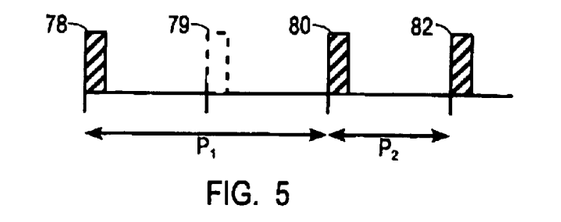
FIG. 5 shows a first timing diagram of an exemplary pulse train with a missing pulse.

The tested-for scenario of task 76 is depicted in the timing diagram of FIG. 5. In this scenario, a pulse 79 that occurred between a first-sensed pulse 78 and a second-sensed pulse 80 was missed or overlooked by pulse sensor 12. Since pulse 79 was missed by pulse sensor 12, PTR 40 does not accurately characterize the pulse train. In particular, the expected period $P_1$ described by average period 48 is inaccurate. Consequently, when a pulse 82 immediately subsequent to pulse 80 is sensed by pulse sensor 12, the new period for pulse 82 will not match the expected period $P_1$. But it will match an alternate period $P_2$ of one-half the expected period $P_1$. Thus, one of the expected period and the alternate period should be a rational multiple of the other for the new period to be considered valid.

When task 76 detects a match, a task 84 is performed by multi-period periodicity validator 38 to serve as a control element and a missing pulse calculator. In particular, task 84 estimates the number of pulses that have been overlooked by pulse sensor 12. When the new period matches one-half average period 48, the number of overlooked pulses may be calculated as follows:

Updated No. Missing=$2*NM+NP-1$   EQ. 2 where,

NM=old number missing 46 for the selected PTR 40, and
NP=old number of pulses 42 for the selected PTR 40.

In the scenario depicted in FIG. 5, NM=0 and NP=2, so task 84 estimates that one pulse has been overlooked, and updates number missing 46 accordingly.

Task 84 also updates the expected period to reflect the timing parameters of the new pulse and the identified missing pulses. The updated average period 48 may be calculated as follows:

$$\text{Updated Avg. Period} = (NS-FS)/(NP+NM) \qquad \text{EQ. 3}$$

where,

NS=new start 30,

FS=first start 52 from the selected PTR 40,

NP=old number of pulses 42 for the selected PTR 40, and

NM=updated number missing 46 for the selected PTR 40. This calculation will change the expected period to be approximately one-half of its previous value when a match is found with one-half the expected value.

When task 76 fails to detect a match with the alternate period of one-half the expected period, multi-period periodicity validator 38 performs a query task 86 to evaluate a match with another alternate period of twice the expected period. Thus, task 86 serves as another period detector. But in task 86 the new period is compared against twice the expected period represented by average period 48 of the selected PTR 40.

Figure 6:
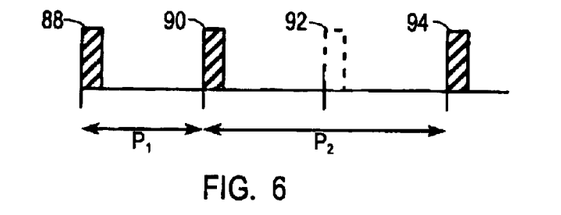
FIG. 6 shows a second timing diagram of an exemplary pulse train with a missing pulse.

The tested-for scenario of task 86 is depicted in the timing diagram of FIG. 6. In this scenario, first-sensed and second-sensed pulses 88 and 90 occurred in order, and were sensed by pulse sensor 12. Thus, the expected period recorded in PTR 40 more or less accurately characterizes the pulse train. But, a pulse 92 occurred after second-sensed pulse 90 and was overlooked by pulse sensor 12, then a third-sensed pulse 94 occurred after pulse 92 and was sensed by pulse sensor 12. Since pulse 92 was missed by pulse sensor 12, the new period is inaccurate. In particular, the expected period $P_1$ described by average period 48 is accurate. But new period $P_2$ is inaccurate due to overlooked pulse 92. Consequently, when third-sensed pulse 94 is sensed, the new period for third-sensed pulse 94 does not match the expected period $P_1$. But it will match an alternate period $P_2$ of twice the expected period $P_1$. Again, one of the expected period and the alternate period should be a rational multiple of the other for the new period to be considered valid.

When task 86 detects a match, task 84 is performed by multi-period periodicity validator 38 to serve as a missing pulse calculator. Task 84 estimates the number of pulses that have been overlooked by pulse sensor 12. When the new period matches twice average period 48, the number of overlooked pulses may be estimated simply by adding one to the previously recorded number of missing pulses 46. Task 84 also updates the expected period to reflect the timing parameters of the new pulse and the identified missing pulse. The updated average period 48 may be calculated as described above in EQ. 3. But in this scenario, the calculation of EQ. 3 should change the expected period very little because it was already relatively accurate. Nevertheless, the resulting expected period should be more accurate because the averaging effect of EQ. 3 should reduce noise.

When task 86 fails to detect a match with the alternate period of twice the expected period, multi-period periodicity validator 38 performs a query task 96 to evaluate a match with the expected period. Task 96 serves as yet another period detector. But in task 96 the new period is compared against the expected period represented by average period 48 of the selected PTR 40. Task 96 tests for a scenario where the previous pulse in the pulse train was sensed by pulse sensor 12, and the selected PTR 40 already indicates a relatively accurate expected period. This scenario may occur when no pulses have been overlooked since the first-sensed pulse of this pulse train or when missed pulses have already been accounted for through tasks 76 and 86.

When task 96 detects a match with the expected period, a task 98 updates the average period 48. Task 98 may implement EQ. 3 in making its period calculation. Since the previous expected period was already relatively accurate, task 98 will cause the expected period to vary little. But the resulting expected period should be more accurate because the averaging effect of EQ. 3 should reduce noise.

When multi-period periodicity validator 38 completes task 84, a query task 100 is performed. Task 100 serves as a control element and determines whether the number of missing pulses exceeds a predetermined maximum number. When task 100 determines that this maximum number has been exceeded, then a task 102 is performed to clear the selected PTR 40, and program flow then proceeds back to task 56 to evaluate whether the new pulse matches another PTR 40. The period associated with the new pulse could not be validated in the context of the existing pulse train. In this situation, pulse evaluator 14 concluded that this pulse train could not serve as the basis for indicating the presence of an active radar signal due to the excessive number of missing pulses. Accordingly, the PTR 40 that was tracking the pulse train was cleared. Pulse evaluator 14 will refrain from indicating the detection of a radar for this now-cleared pulse train because the clearing of PTR 40 prevents such an indication.

When task 100 determines that the number of missing pulses does not exceed the predetermined maximum, and upon completion of task 98, multi-period periodicity validator 38 performs a task 106. Task 106 updates additional data elements in the selected PTR 40. For example, task 106 desirably updates the average width 44 by working the width of the new pulse into the existing average. This may be accomplished by following EQ. 1. In addition, the number of pulses 42 is desirably incremented by one to account for the new pulse, and last start 50 is desirably overwritten with new start 30.

Following task 106, multi-period periodicity validator 38 has completed its function for the new pulse, and the new pulse has been validated. Pulse evaluator 14 then performs a query task 108 to determine whether the number of pulses 42 is greater than or equal to a predetermined number of pulses that serves as a threshold. So long as this threshold has not yet been reached, program flow exits pulse evaluator 14. But pulse evaluator 14 will activate again when pulse sensor 12 captures another pulse.

When task 108 determines that the threshold has been reached, a task 110 declares the presence of an active radar signal by activating an appropriate indicator, and a task 112 clears the selected PTR 40. As a result of task 110 declaring the presence of a radar, a WLAN or other radio device that shares spectrum with the just-detected radar will desirably switch to a different channel before transmitting any signal.

Referring back to task 96, when multi-period periodicity validator 38 fails to detect a match between the new period and the expected period or any of the acceptable alternate periods, the new pulse cannot be validated in the context of the existing pulse train. In this situation, a query task 114 determines whether the new period exceeds the maximum period multiplied by the integral multiplier N, much like discussed above in connection with task 68. When the new period exceeds this maximum threshold, program flow proceeds to task 102 to clear the selected PTR 40 then return to task 56 to evaluate the new pulse in connection with other PTRs 40. When task 114 determines that the new period does not exceed this maximum threshold, a task 116 determines whether the number of missing pulses 46 is at its maximum with the new period being greater than the average period 48. When this condition is detected, program flow again proceeds to task 102 to clear the selected PTR 40, then return to task 56. When the "yes" conditions of tasks 114 and 116 occurs, pulse evaluator 14 discards the existing pulse train because it has concluded that the existing pulse train cannot serve as a basis for indicating the presence of an active radar signal.

When task 116 determines that the number of missing pulses 46 is not at its maximum or that the new period is not greater than the average period 48, pulse evaluator 14 assumes that the new pulse was an anomaly but that the pulse train may still serve as a basis for indicating the presence of a radar. Program flow returns to task 56 to evaluate the new pulse in connection with other PTRs 40.

FIG. 4 shows a block diagram of an embodiment of a multi-period periodicity validator 38 that may be easily implemented in hardware. As discussed above in connection with FIG. 3, there are several possible pulse period matches. Likewise, the FIG. 4 embodiment also tracks the number of missing pulses and updates the expected pulse period.

The new pulse period is again measured by subtracting the last start 50 from the new start 30 in a subtractor 118. The new pulse period is compared to the expected pulse period in a period detector 120, but also to one-half the expected pulse period in a period detector 122 and to twice the expected pulse period in a period detector 124. This arrangement may be extended to M/N and 1 through N times the expected pulse period, as discussed above. In each of the pulse detectors 120, 122, and 124, this comparison is performed by a subtractor 126. Those skilled in the art will appreciate that the division and multiplication by two of the expected or average period 48 may be accomplished merely by shifting average period 48 one bit to the left or right.

In each of pulse detectors 120, 122, and 124 the absolute values of the differences between the new pulse period and the expected or alternate pulse periods are obtained in circuits 128, and the results are respectively compared to desired period match accuracies 130 in respective comparators 132. The accuracy may be the same for each of the expected and alternate pulse periods, or it may be different for each case. The output of this comparison is a one if the new pulse period matches the respective expected or alternate pulse period to within the desired accuracy. If the desired accuracy is not met, the output of the comparison is zero.

The output of each comparison is input to a 3-input OR gate 134, the output of which will be one if any of the inputs are one or zero otherwise. An OR gate 134 output value of one indicates that the new pulse period is valid because it matches either the expected period or one of the alternate periods.

The outputs of the comparators 132 are also used to select the number of missing pulses encountered so far in respective multiplexers 136 and a revised expected-pulse period from a multiplexer 138. In the case of a match to one-half the expected period, the number of missing pulses will be the number of missing pulses 46 already detected, times two in a multiplier 139, plus the number of pulses 42 already received minus one in an adder 140. The revised pulse period will be one-half the expected pulse period.

Figure 7:
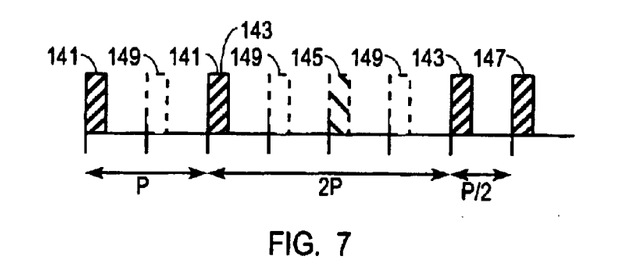
FIG. 7 shows a third timing diagram of an exemplary pulse train with missing pulses.

A case where this might be seen occurs when three pulses have already been received, the first two spaced by time period P, and the last two spaced by time period 2P.

FIG. 7 shows this case. Since the time period of the last two old pulses 143 is twice that of the first two 141, there has been one missing pulse 145 counted so far, and the expected pulse period is P. If a new pulse 147 comes in with a period of P/2 (from the last old pulse 143 to the new pulse 147), it then appears that the true period should be P/2, and that (1*2)+(3−1)=4 pulses have been missed. In addition to missed pulse 145, three additional missed pulses 149 may be accounted for. In this situation, the three additional missed pulses 149 are all positioned between sensed or previously-accounted-for missing pulses. No consecutive missed pulses are accounted for as a result of new pulse 147 because missed pulse 145 had already been accounted for.

In the case of a match to the expected period, the number of missing pulses 46 and the expected pulse period 48 retain their previous values. This missing pulse value 46 is selected by multiplexer 136 for period detector 120 as controlled by the comparator 132 for period detector 120, and is passed through the multiplexer 136 for period detector 122 and controlled by the comparator 132 for period detector 122. The expected pulse period value is selected only by the comparator 132 for pulse detector 122. The expected pulse period is never increased.

In the case of a match to twice the expected period, the number of missing pulses is incremented by one in an adder 142, and the expected pulse period remains the same.

Figure 8:
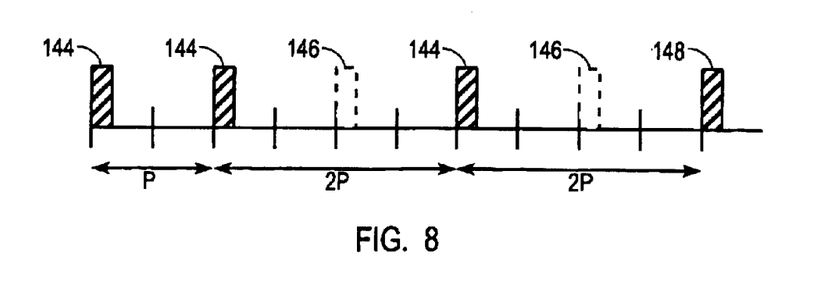
FIG. 8 shows a fourth timing diagram of an exemplary pulse train with missing pulses.

A case where this might be the seen occurs when three pulses have already been received, the first two spaced by time period P, and the last two spaced by time period 2P.

FIG. 8 shows this case. Since the time period of the last two old pulses 144 is twice that of the first two, there has been one missing pulse 146 counted so far, and the expected pulse period is P. If a new pulse 148 comes in with a period of 2P, then it appears that another pulse has been missed, for a total of two. This number works its way up the multiplexers 136 to the output of the top multiplexer 136.

In the case of no match to any of the possible pulse periods, the number of missing pulses 46 and the expected pulse period 48 remain the same.

The output of the top multiplexer 136, the number of missing pulses 46, is used as an output to the radar detector algorithm as discussed above. It is also compared at a comparator 149 with the maximum number of missing pulses 42 that the detector will allow in any one radar detection. Limiting the number of missing pulses allowed will lower the probability of false alarm. If the number of missing pulses is OK and the new pulse period matches an expected pulse period, then an AND gate 150 will output 1 to indicate an acceptable pulse period match. If the number of missing pulses is too high, the output of the AND gate 150 will remain low, even if there was a pulse period match, indicating that no acceptable pulse period match has been found.

In a preferred embodiment, missing pulses are recognized and a pulse period match is indicated even if the pulse periods are only related by M/N or 1 through N times the expected pulse period. This allows more pulses to be collected and recognized as having the same pulse period than if missing pulses are not taken into account. The number of missing pulses accepted may be limited to control the false alarm rate.

Consider the case of only five radar pulses being transmitted. At least three pulses should be received for reasonable radar detection. The first two create an expected period, which is confirmed by the third pulse. If the radar detector cannot handle missing pulses, and if the third pulse of the five available is not detected, the detector will fail to see three pulses in a row with the same pulse period. It will not detect the radar and an unacceptably high false-negative rate will result.

If missing pulses are handled as taught herein or the equivalent, the radar would be detected on the fourth pulse, with one missing pulse counted. The detection is successful, and the probability of detection has been increased. It would also have been possible to have required four pulses per radar detection. Requiring additional pulses further reduces the chance that random signals might trigger the radar detector, reducing the false alarm rate. This will in general reduce the probability of detection a small amount, but as can be seen in this case, that probability may still be better than the prior-art detector.

In summary, an improved radar detector having a multi-period periodicity validator is provided. The multi-period periodicity validator accounts for missing pulses. A pulse evaluator is provided which achieves a suitable false-negative rate because no limitation is imposed regarding the receipt of consecutive radar pulses. And, a plurality of potential radar pulse trains may be tracked simultaneously.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the matches discussed herein are most reliably performed without using extreme precision and will be able to devise appropriate tolerances to use in declaring matches. Likewise, those skilled in the art will appreciate that many of the tasks and blocks need not be configured exactly as specified herein or sequenced precisely as specified herein to achieve similar results. And, the pulse evaluator discussed herein may evaluate additional characterizing features of pulses, such as pulse frequency, in associating new pulses with previously-detected pulse trains. These and other changes and modifications which are within the level of skill in the art are intended to be included in the scope of the present invention.

What is claimed is:

1. A radar detector having a multi-period periodicity validator, said radar detector comprising:
    a pulse sensor configured to sense a received pulse;
    a first-period detector coupled to said pulse sensor and configured to detect a first period;
    a second-period detector coupled to said pulse sensor and configured to detect a second period, said second period being different from said first period; and
    a control element, coupled to said first-period detector and to said second-period detector, said control element being configured to determine if a pulse sensed at said pulse sensor exhibited a period matching one of said first and second periods.

2. A radar detector as claimed in claim 1 wherein said first period is either one-half or twice said second period.

3. A radar detector as claimed in claim 1 additionally comprising a third-period detector coupled to said pulse sensor and configured to detect a third period, said third period being different from said first and second periods.

4. A radar detector as claimed in claim 3 wherein:
    said first period is one-half of said second period; and
    said third period is twice said second period.

5. A radar detector as claimed in claim 1 additionally comprising a missing-pulse calculator coupled to said first-period detector, said missing pulse calculator being configured to estimate a number of pulses overlooked by said pulse sensor.

6. A radar detector as claimed in claim 5 wherein:
    said control element is configured to indicate detection of a radar after said pulse sensor senses a first predetermined number of received pulses; and
    said control element is further configured to refrain from indicating detection of a radar when a second predetermined number of pulses have been estimated as being overlooked.

7. A radar detector as claimed in claim 1 additionally comprising a pulse-train register configured to store a pulse-train record, said pulse-train record being configured to indicate a number of pulses previously received in connection with a train of pulses sensed at said pulse sensor.

8. A radar detector as claimed in claim 7 wherein said first-period and second-period detectors are enabled after said pulse-train record indicates at least two pulses have been previously received in connection with said train of pulses.

9. A radar detector as claimed in claim 7 wherein:
    said pulse-train register includes a plurality of pulse-train records;
    each of said pulse-train records indicates a pulse width for pulses included in said pulse train; and
    a received pulse sensed by said pulse sensor is associated with a pulse train by matching a pulse width of said received pulse with a pulse width indicated in one of said pulse-train records.

10. A radar detector as claimed in claim 7 wherein:
    said pulse-train register is configured to store up to a plurality of pulse-train records to simultaneously track a plurality of pulse trains;
    said first-period detector, said second-period detector, and said control element are included in a pulse evaluator coupled to said pulse-train register and to said pulse sensor;
    said pulse evaluator is configured to clear an existing pulse-train record when said existing pulse-train record tracks a pulse train that cannot serve as a basis for indicating detection of a radar; and
    said pulse evaluator is configured to open a new pulse-train record when a received pulse has been sensed that may be the beginning of a pulse train not currently being tracked by a pulse-train record in said pulse-train register.

11. A method for detecting the presence of an active radar signal comprising:
    a) establishing an expected period for pulses in a pulse train;
    b) sensing a received pulse having timing parameters;
    c) determining whether said timing parameters of said received pulse match said expected period; and
    d) determining whether said timing parameters of said received pulse match an alternate period, said alternate period being different from said expected period.

12. A method as claimed in claim 11 wherein said alternate period is either one-half or twice said expected period.

13. A method as claimed in claim 11 wherein:
    said alternate period is a first-alternate period;
    said method additionally comprises determining whether said timing parameters of said received pulse match a second-alternate period; and
    said second-alternate period is different from said expected period and said first-alternate period.

14. A method as claimed in claim 13 wherein:
said first-alternate period is one-half of said expected period; and
said second-alternate period is twice said expected period.

15. A method as claimed in claim 11 additionally comprising estimating, when said timing parameters of said received pulse match said alternate period, a number of pulses from said pulse train that have been overlooked.

16. A method as claimed in claim 15 additionally comprising:
indicating detection of said active radar signal when a first predetermined number of received pulses from said pulse train have been sensed; and
preventing the indication of said active radar signal when a second predetermined number of received pulses have been estimated as being overlooked.

17. A method as claimed in claim 11 wherein:
said establishing activity a) comprises:
sensing first and second received pulses, and
calculating said expected period as being a duration between said first and second pulses; and
said sensing activity b) senses a third received pulse.

18. A method as claimed in claim 17 additionally comprising revising said expected period after sensing said third received pulse.

19. A method as claimed in claim 11 wherein said method additionally comprises:
tracking a plurality of pulse trains using a plurality of pulse-train records, wherein each of said plurality of pulse-train records indicates a pulse width for pulses of one of said plurality of pulse-trains; and
associating said received pulse with one of said plurality of pulse trains by comparing a pulse width for said received pulse with said pulse widths indicated in said plurality of pulse-train records.

20. A radar detector having a multi-period periodicity validator, said radar detector comprising:
a pulse sensor configured to sense a received pulse;
a first-period detector coupled to said pulse sensor and configured to detect an expected period;
a second-period detector coupled to said pulse sensor and configured to detect a first-alternate period;
a third-period detector coupled to said pulse sensor and configured to detect a second-alternate period, wherein said first-alternate period is one-half of said expected period, and said second-alternate period is twice said expected period; and
a control element coupled to said first-period detector, said second-period detector, and said third-period detector, said control element being configured to determine if a pulse sensed at said pulse sensor exhibited a period matching one of said expected, first-alternate, or second-alternate periods.

21. A radar detector as claimed in claim 20 wherein:
said control element is configured to indicate detection of an active radar signal after said pulse sensor senses a predetermined number of received pulses exhibiting a combination of said expected, first-alternate, and second-alternate periods.

22. A radar detector as claimed in claim 21 wherein said control element is configured to indicate detection of said active radar signal when pulse widths for each of said predetermined number of received pulses match one another.

* * * * *